Figures 3, 4, 7:
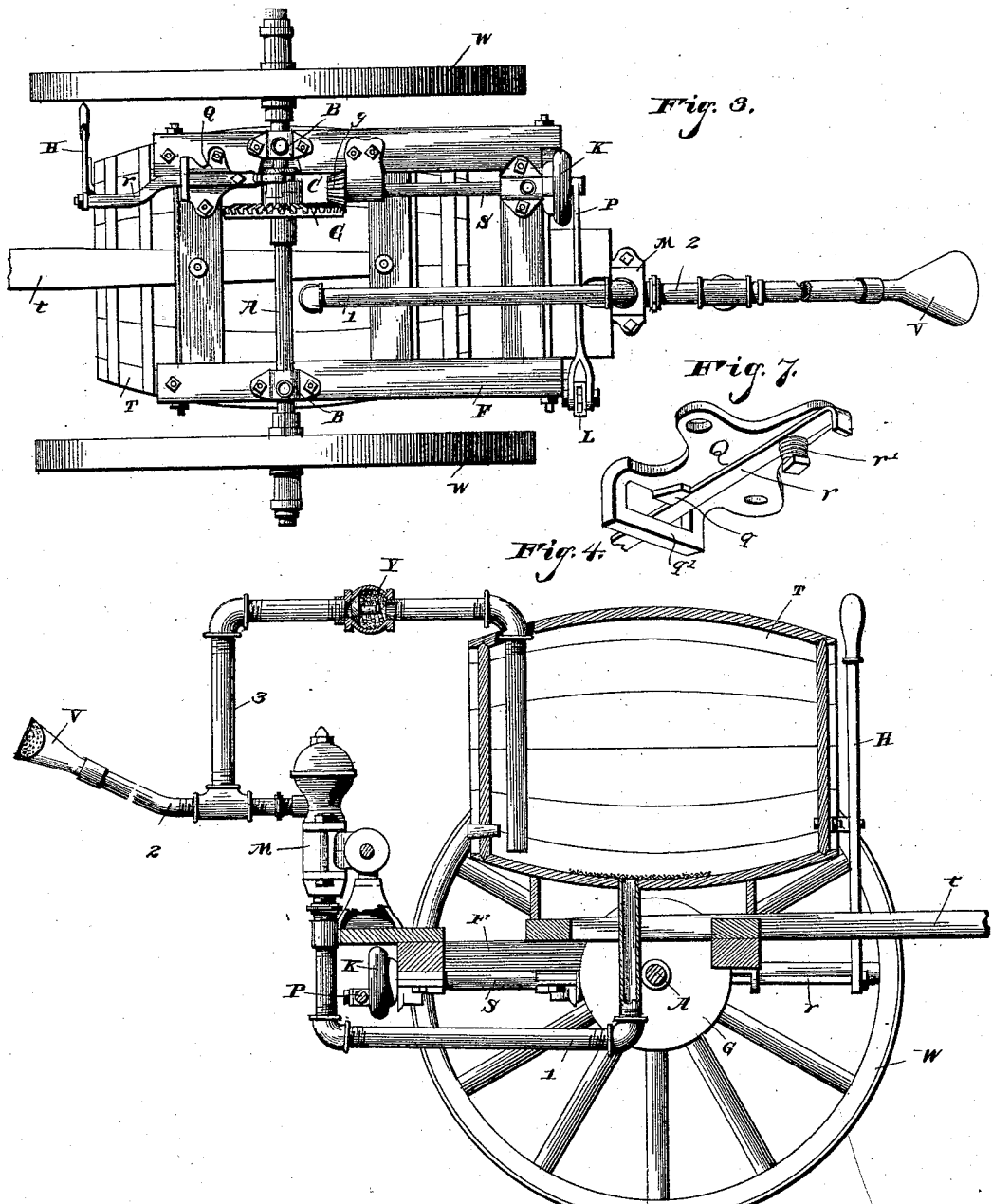

(No Model.) 2 Sheets—Sheet 1.
D. PRATT.
INSECTICIDE DISTRIBUTER.
No. 455,463. Patented July 7, 1891.
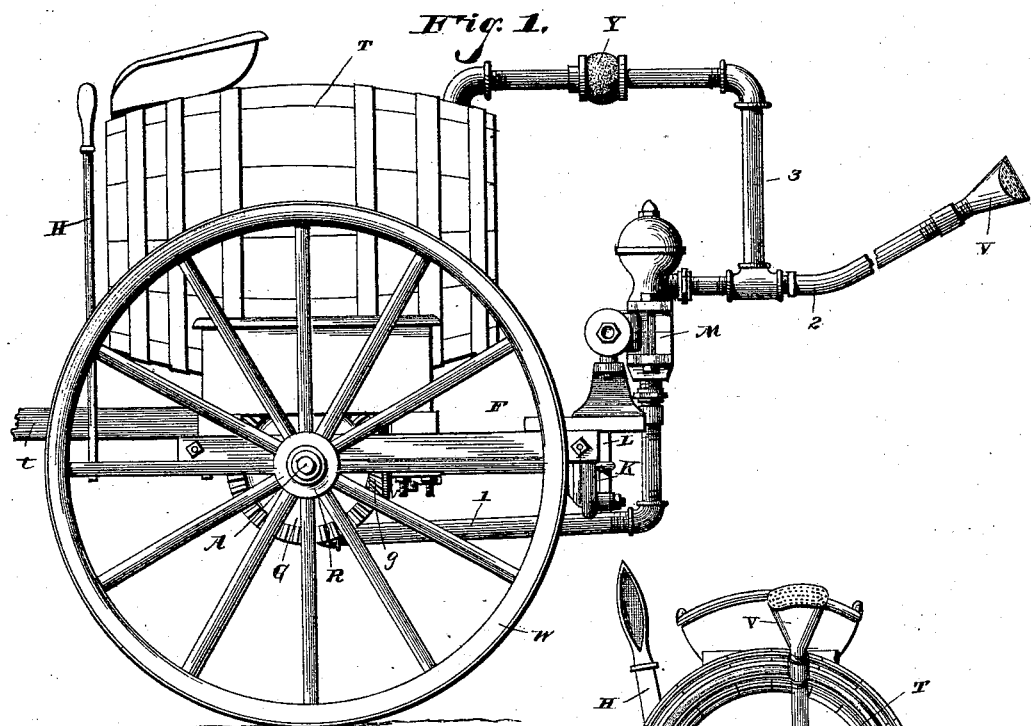
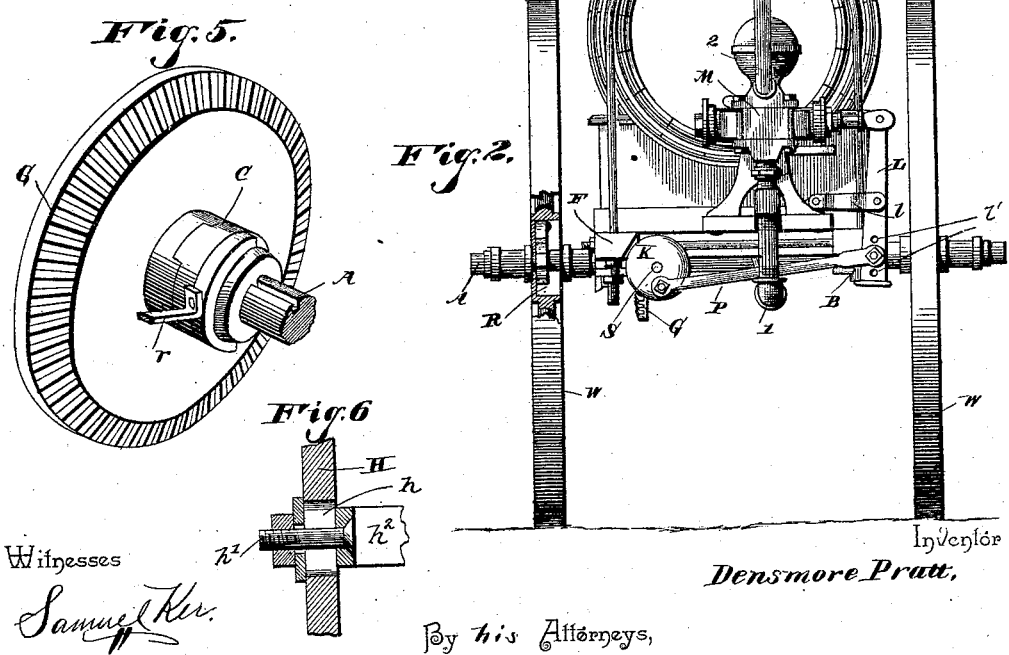
Witnesses
Samuel Ker.
Inventor
Densmore Pratt,
By his Attorneys,
N. J. Collamer
C. A. Snow & Co.

(No Model.) 2 Sheets—Sheet 2.

D. PRATT.
INSECTICIDE DISTRIBUTER.

No. 455,463. Patented July 7, 1891.

Witnesses
Samuel Ker.
N. J. Collamer

Inventor
Densmore Pratt.
By his Attorneys,
C. A. Snow & Co.

UNITED STATES PATENT OFFICE.

DENSMORE PRATT, OF EAST AURORA, NEW YORK.

INSECTICIDE-DISTRIBUTER.

SPECIFICATION forming part of Letters Patent No. 455,463, dated July 7, 1891.

Application filed September 19, 1890. Serial No. 365,498. (No model.)

*To all whom it may concern:*

Be it known that I, DENSMORE PRATT, a citizen of the United States, residing at East Aurora, in the county of Erie and State of New York, have invented a new and useful Insecticide-Distributer, of which the following is a specification.

This invention relates to sprinkling-machines, and more especially to that class thereof known as "force feed;" and the object of the same is to provide a machine for spreading insecticide broadcast, which machine shall possess certain improvements upon devices of the same general character heretofore made.

To this end the invention consists of the specific details of construction hereinafter more fully described and claimed, and as illustrated in the drawings, in which—

Figure 1 is a side elevation of this machine. Fig. 2 is a rear elevation of the same. Fig. 3 is a bottom plan view thereof. Fig. 4 is a central vertical longitudinal section. Fig. 5 is a detail of the clutch upon the main axle.
Fig. 6 is an enlarged section through the pivot of the handle-lever. Fig. 7 is an enlarged perspective view of the pivot of the rod operated by said handle.

Referring to the drawings, the letters W designate wheels, upon which is mounted a frame F, carrying a tank T—in the present case a barrel, as shown in the drawings. This frame is provided with a pair of shafts or a tongue *t* and is adapted to be drawn by a team or a single horse in the well-known manner, the driver sitting upon the seat, as will be obvious. The tank is filled with paris-green and water or with any other good insecticide in a liquid state which it is desired to spread broadcast upon a field, as of potatoes. The wheels W are mounted loosely upon the main axle A, which turns in bearings B beneath the frame F, and ratchet-boxes R of the ordinary and well-known construction connect the wheels with the axle, whereby when the wheels are turned forwardly the axle will be turned by them, as well understood.

Upon the main axle beneath the frame F a clutch C is mounted, which is connected thereto by spline and groove, as shown in Fig. 5, and a rod *r* is connected at one end to this clutch, pivoted between its ends in a bracket Q, carried by the frame, and connected at its other end with a handle-lever H, extending up to within easy reach of the driver. By this means the clutch can be thrown into or out of connection with a large gear G, which is mounted loosely upon the main axle A.

Another gear *g* meshes with the large gear G and drives a short shaft S, journaled longitudinally of the frame, and upon the rear end of this shaft is a crank-wheel K, connected by pitman P with a lever L. The latter has several holes *l'* in its body, whereby the connection with the pitman P may be adjusted to cause the pump to have a longer or shorter throw, according as the case may demand. The latter is connected at its center by a link *l* with some suitable part of the frame and at its upper end with the pump-rod of any ordinary force-pump M, mounted upon the rear end of the frame F, and which I do not consider it necessary to describe more in detail in this connection.

From the bottom of the tank T a feed-pipe 1 leads below the pitman P to the force-pump M, and from the pump a distributer-pipe 2 leads upwardly and to the rear and is provided with a sprayer V on its free end. This sprayer is of V shape, having a curved rear face, and in this face is a number of fine perforations, so that when the liquid is driven through the sprayer by the force-pump it will be ejected in a great number of fine streams, as will be understood. The sprayer is preferably detachable from the distributer-pipe in order that one with a greater or less number of holes or with finer or coarser perforations can be substituted, as occasion and fancy may dictate. Between the pump and the sprayer an overflow-pipe 3 leads upwardly, enters the top of the tank T, and extends nearly to the bottom thereof, as seen in Fig. 4, and in this pipe at any suitable point is a safety-valve Y. When the speed of the horses drawing the machine is so great that the pump is driven rapidly enough to force more water through the distributer-pipe 2 than can escape through the sprayer, some of the liquid passes up the overflow-pipe 3, the pressure thereof opens the safety-valve Y, and the liquid returns to the interior of the tank.

Various changes in the arrangement and relative location of parts may be made without departing from the spirit of my invention. The distributer-pipe 2 is preferably detachable from the pump M in order that it can be removed when driving the machine from place to place or for cleaning and repair. The tires of the wheels are preferably broad and flat, and said wheels stand about three feet apart or a little over, according as the rows of vegetables or plants are spaced. The handle H is preferably provided with a slot $h$, which is loosely mounted upon a pivot-pin $h'$ in a bracket $h^2$, mounted on the front end of the tank T, in order that the handle may have a slight longitudinal movement. The bracket Q, which is secured to the bottom of the frame F, has a depending slotted ear $q'$, adjacent which is a lug $q$, and the rod $r$ is pivotally mounted on a bolt in this bracket, as shown in Fig. 7, and extends through the slot in said ear, a spring $r'$ being arranged around said bolt to allow the rod to move slightly away from the bracket when the handle H is borne downwardly. With this construction of parts the operator can grasp the handle, bear downwardly thereon to move the rod $r$ out of engagement with the lug $q$, throw the handle to one side to move the rod $r$ laterally within the ear $q'$, and release the handle, when the spring $r'$ will raise it to its normal position and engage the rod $r$ at the other side of the lug. The machine may thus be left in either operative or inoperative position, as will be understood.

Although I have shown a tongue $t$, adapting the machine to be drawn by a team, it will be understood that a single horse will answer in some cases, provided he be so hitched to the frame as to travel between the rows of plants.

Other changes and modifications in the structure and use of this machine will be suggested by experience, and may be made without departing from the principle of my invention.

Having thus described my invention, what is claimed as new is—

1. The combination, with the bracket Q, having the lug $q$, the rod $r$, pivotally mounted on a bolt in said bracket, and the spring $r'$, surrounding said bolt and holding the rod normally against the bracket and in engagement with said lug, of the handle H, connected to one end of said rod and having a slot in its body, the pivot-pin $h'$, engaging said slot, and a clutch C, connected to the other end of said rod, substantially as described.

2. The combination, with the tank, the pump driven by the supporting-axle, and the feed and discharge pipes leading, respectively, to and from said pumps, of the bracket Q, having the lug $q$, the rod $r$, pivotally mounted on a bolt in said bracket, the spring $r'$, surrounding said bolt and holding the rod normally against the bracket and in engagement with said lug, and a clutch on said axle connected to and controlled by said rod, substantially as described.

In testimony that I claim the foregoing as my own I have hereto affixed my signature in presence of two witnesses.

DENSMORE PRATT.

Witnesses:
J. B. RAGAN,
W. B. MOORE.